US012570350B2

(12) United States Patent

Hu et al.

(10) Patent No.: US 12,570,350 B2

(45) Date of Patent: Mar. 10, 2026

(54) SENSING STEERING WHEEL

(71) Applicant: PIXART IMAGING INC., Hsin-Chu (TW)

(72) Inventors: Chin-Hua Hu, Hsin-Chu (TW); Ching-Shun Chen, Hsin-Chu (TW); Yu-Sheng Lin, Hsin-Chu (TW); Yu-Han Chen, Hsin-Chu (TW); Hao-Che Liu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 18/815,824

(22) Filed: Aug. 26, 2024

(65) Prior Publication Data

US 2026/0054768 A1 Feb. 26, 2026

(51) Int. Cl.
B62D 1/06 (2006.01)
B60K 35/10 (2024.01)
B60K 35/60 (2024.01)

(52) U.S. Cl.
CPC ................ B62D 1/06 (2013.01); B60K 35/10 (2024.01); B60K 35/60 (2024.01); B60K 2360/143 (2024.01); B60K 2360/46 (2024.01); B60K 2360/48 (2024.01); B60K 2360/782 (2024.01)

(58) Field of Classification Search
CPC ...................................................... B62D 1/046
See application file for complete search history.

(56) References Cited

U.S. PATENT DOCUMENTS

2012/0118869 A1* 5/2012 Saunders ............... B62D 1/065
219/204
2015/0369633 A1* 12/2015 Karasawa ................ B62D 1/04
324/686
2017/0137050 A1* 5/2017 Michelmann ............ B62D 1/06
2019/0210630 A1* 7/2019 Seok ........................ G06F 3/044
2021/0300454 A1* 9/2021 Hotta ....................... B62D 1/06
2023/0067992 A1* 3/2023 Chen .................... H05B 1/0236

FOREIGN PATENT DOCUMENTS

JP          2022026032 A  *  2/2022

* cited by examiner

*Primary Examiner* — Daniel D Yabut
(74) *Attorney, Agent, or Firm* — Li & Cai Intellectual Property Office

(57) ABSTRACT

A sensing steering wheel includes a wheel handle and a sensing layer. The sensing layer retractably sleeves the wheel handle, and the sensing layer includes an elastic substrate layer and an elastic sensor layer disposed on the elastic substrate layer. The elastic sensor layer includes a plurality of sensing lines, a plurality of sensing patterns connected to the plurality of sensing lines, respectively, and each of the sensing patterns having a mesh structure, at least one ground line, and a plurality of ground wires branching from the at least one ground line and extending into spaces among the plurality of sensing patterns.

8 Claims, 12 Drawing Sheets

SENSING STEERING WHEEL

CROSS-REFERENCE TO RELATED PATENT APPLICATION

Field of the Disclosure

The present disclosure relates to a sensing device, and more particularly to a sensing steering wheel.

Background of the Disclosure

In the steering wheels utilizing the sensor fabrics, "dead zones" refer to areas where there are no sensors. The dead zones are unable to detect touch or pressure, and therefore, do not provide any input to the system. Such zones may occur at regions where the steering wheel leather is stitched with other parts. The process of stitching can create physical barriers that prevent the placement of sensors. Moreover, the stitches themselves can interfere with the operation of nearby sensors, leading to inaccurate readings or false signals.

SUMMARY OF THE DISCLOSURE

In response to the above-referenced technical inadequacies, the present disclosure provides a sensing steering wheel that utilizes a stretchable material as a base material of a sensing layer, so as to greatly reduce wrinkles and dead zones.

In order to solve the above-mentioned problems, one of the technical aspects adopted by the present disclosure is to provide a sensing steering wheel, which includes a wheel handle and a sensing layer. The sensing layer is retractably sleeved on the wheel handle, and the sensing layer includes an elastic substrate layer and an elastic sensor layer disposed on the elastic substrate layer. The elastic sensor layer includes a plurality of sensing lines, a plurality of sensing patterns connected to the plurality of sensing lines, respectively, and each of the sensing patterns having a mesh structure, at least one ground line, and a plurality of ground wires branching from the at least one ground line and extending into spaces among the plurality of sensing patterns.

In order to solve the above-mentioned problems, another one of the technical aspects adopted by the present disclosure is to provide a sensing steering wheel, including a wheel handle, a sensing layer, and a processing circuit. The sensing layer is retractably sleeved on the wheel handle, and the sensing layer includes an elastic substrate layer and an elastic sensor layer disposed on the elastic substrate layer. The elastic sensor layer includes a plurality of sensing lines, a plurality of sensing patterns, at least one ground line and a plurality of ground wires. The plurality of sensing patterns are connected to the plurality of sensing lines, respectively, and each of the sensing patterns has a mesh structure and overlaps with a seam area of the sensing area. The plurality of ground wires branch from the at least one ground line and extend into spaces among the plurality of sensing patterns. The processing circuit is electrically connected to the sensing lines. The sensing layer has an enclosed ring structure with seam portions, and the seam portions are inter-connected at the seam area. The processing circuit is electrically connected to the sensing lines through a plurality of conductive wires, respectively, and the conductive wires are used to stitch the seam portions together at the seam area by penetrating through the elastic substrate layer and the elastic sensor layer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
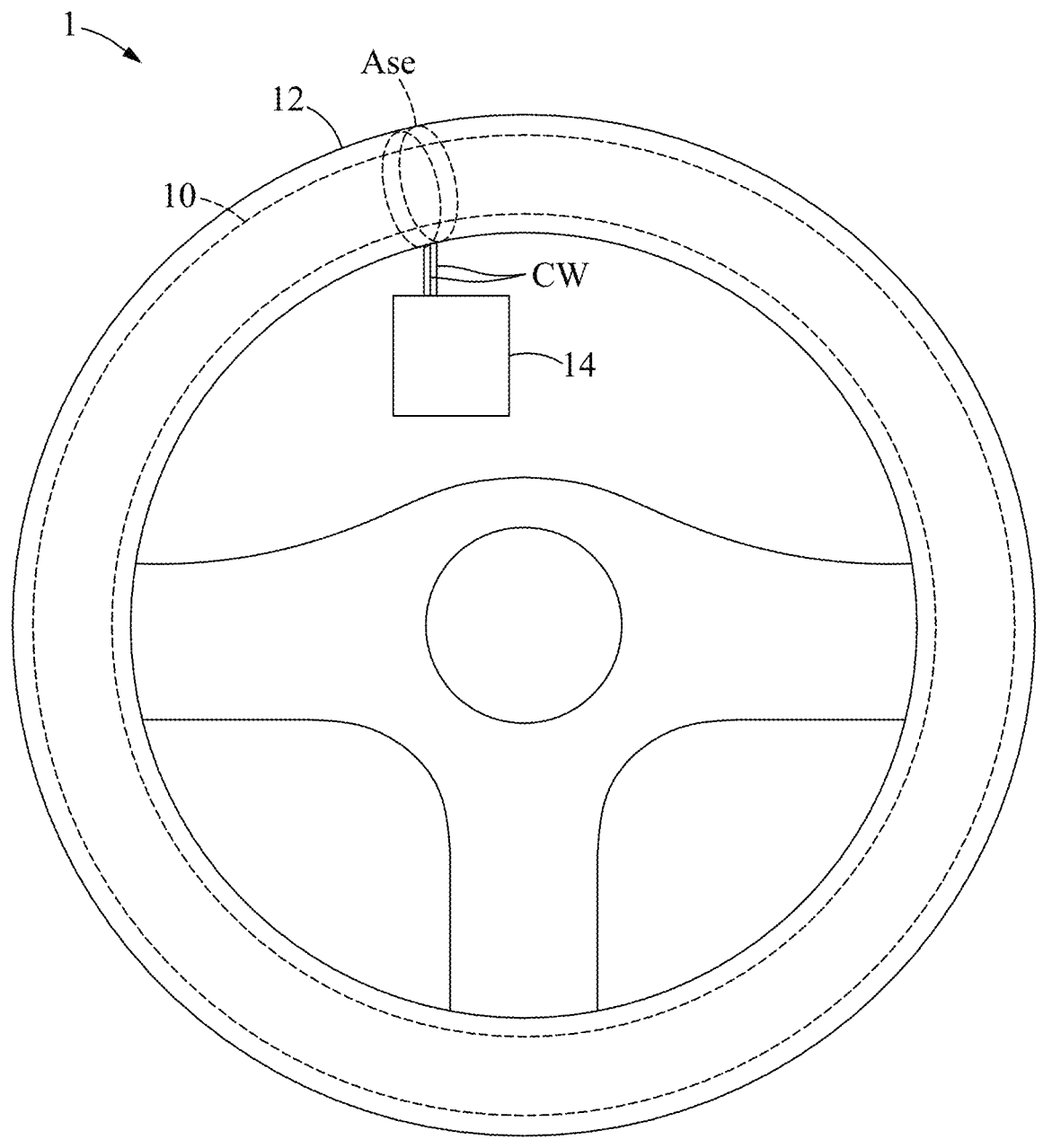
FIG. 1 is a top view of a sensing steering wheel according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
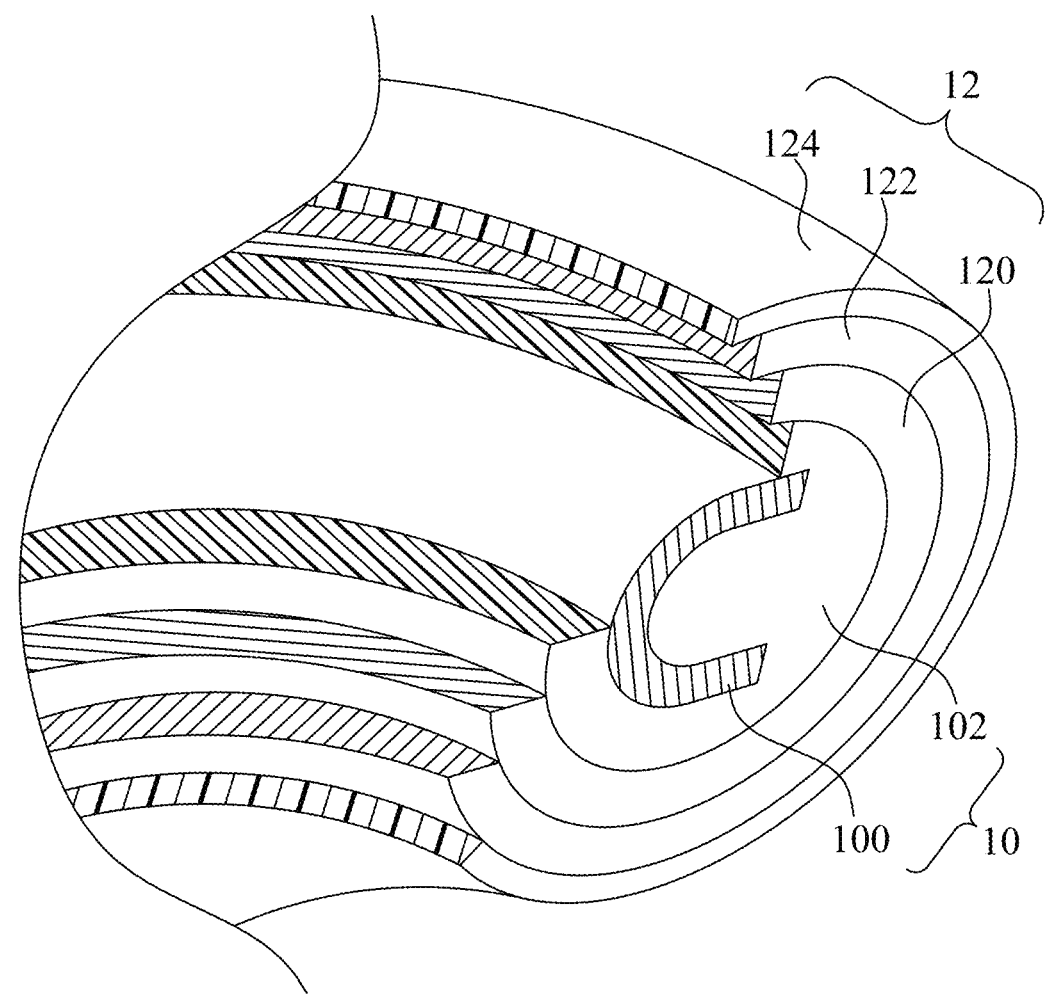
FIG. 2 is a partial cross-sectional view of the sensing steering wheel according to one embodiment of the present disclosure.

FIG. 1 is a top view of a sensing steering wheel according to one embodiment of the present disclosure, and FIG. 2 is a partial cross-sectional view of the sensing steering wheel according to one embodiment of the present disclosure. Referring to FIG. 1, one embodiment of the present disclosure provides a sensing steering wheel 1, which includes a wheel handle 10 and a sensing layer 12. The sensing layer 12 is retractably sleeved on the wheel handle 10.

In the embodiment of FIGS. 1 and 2, the wheel handle 10 can be a wheel ring of the sensing steering wheel 1, and the wheel ring can be connected to a hub at the center of the wheel ring through one or more spokes.

As shown in FIG. 2, the sensing steering wheel 1 is provided with a steering handle 10 and the sensing layer 12 in an order from the inside to the outside. The steering handle 10 can be annular and include a frame 100 and an inner protective layer 102, and the sensing layer 12 includes an elastic substrate layer 120, an elastic sensor layer 122 and an outer protection layer 124.

The frame 100 can be made of hard material such as metal or wood, and the inner protective layer 102 can include, for example, a leather layer and/or a foam material layer.

Figure 3:
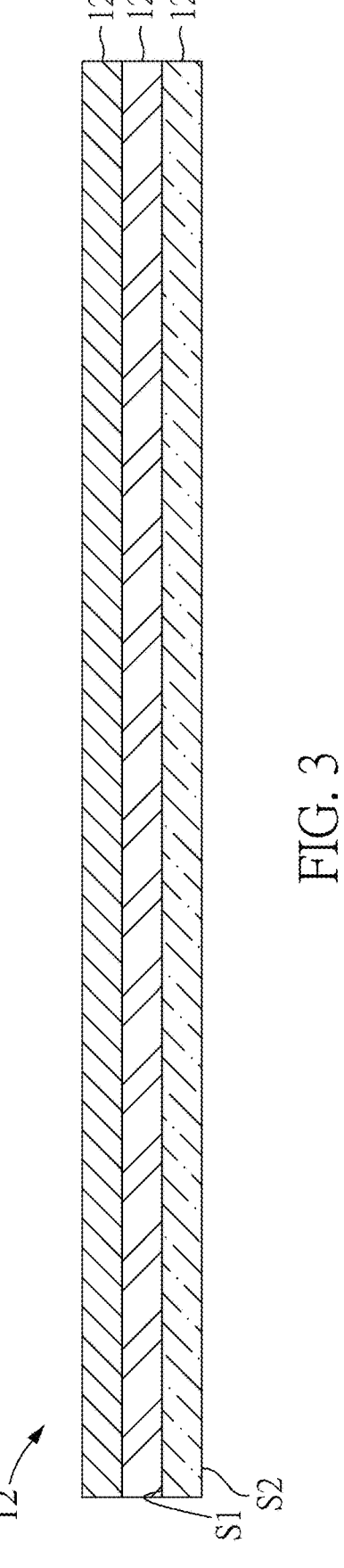
FIG. 3 is a schematic cross-sectional view of the sensing layer according to one embodiment of the present disclosure.
Figure 4:
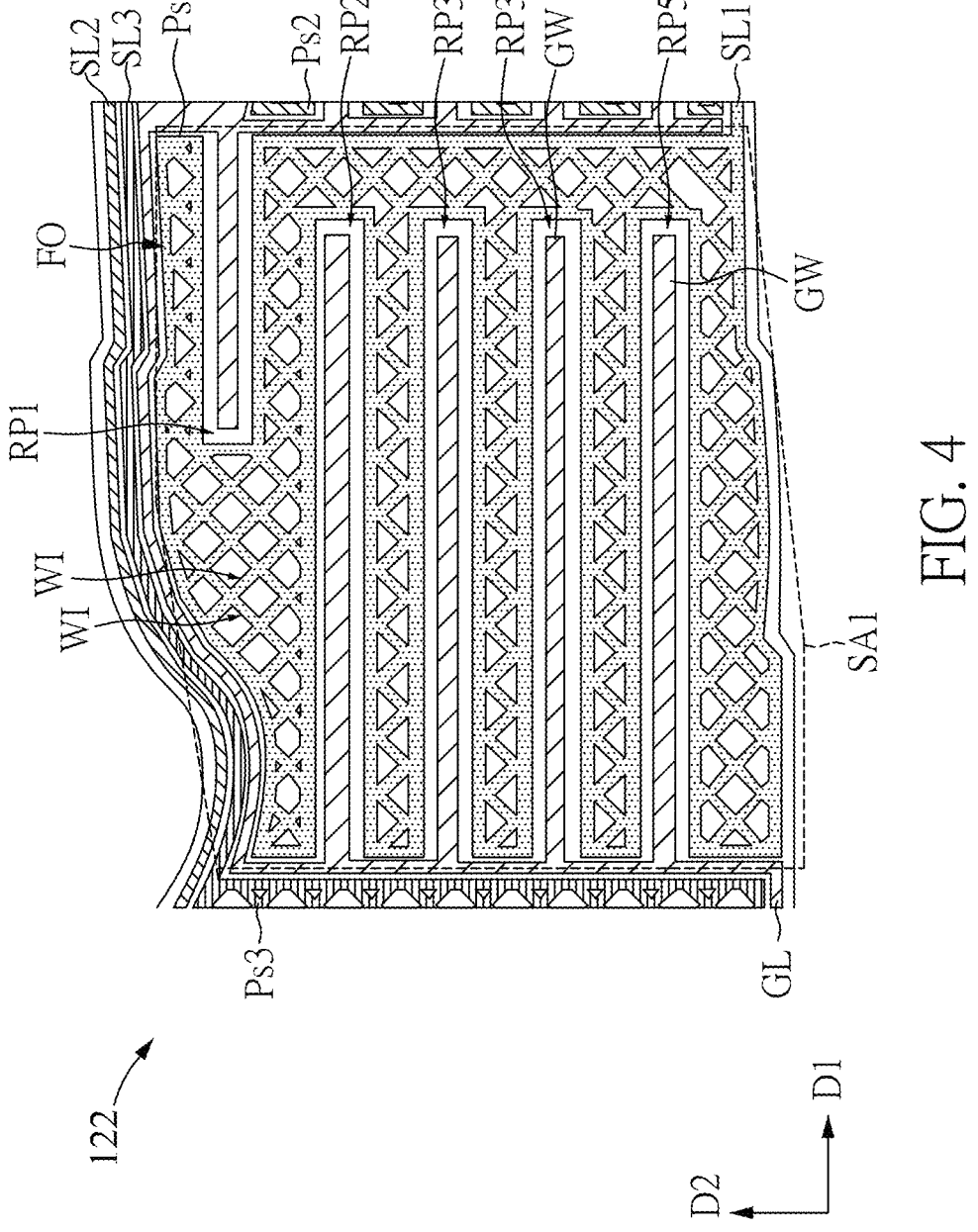
FIG. 4 is a top view of the elastic sensor layer according to one embodiment of the present disclosure.

Reference is made to FIGS. 3 and 4. FIG. 3 is a schematic cross-sectional view of the sensing layer according to one embodiment of the present disclosure, and FIG. 4 is a top view of the elastic sensor layer according to one embodiment of the present disclosure. As shown in FIG. 3, for convenience of explanation, the sensing layer 12 is shown as a flat multi-layer structure. The elastic substrate layer 120 can be made of an elastic material such as thermoplastic polyurethane (TPU), thermoplastic vulcanizate or thermoplastic rubber, and has a first surface S1 and a second surface S2 that are opposite to each other. The TPU or other stretchable materials can be used to as a base material to make the sensing layer 12 stretchable, such that wrinkles can be greatly reduced when sleeving the sensing layer 12 onto the steering handle 10.

The elastic sensor layer 122 can be disposed on the elastic substrate layer 120. Referring to FIG. 4, the elastic sensor layer 122 can include one or more sensing lines, one or more sensing patterns, and one or more ground lines. For example, the elastic sensor layer 122 includes sensing lines SL1, SL2, SL3, sensing patterns Ps1, Ps2, Ps3, and the ground line GL, and the elastic sensor layer 122, including the sensing lines SL1, SL2 and SL3, the sensing patterns Ps1, Ps2 and Ps3, and the ground line GL, can be formed by printing an elastic conductive material on the elastic substrate layer 120.

It should be noted that the elastic sensor layer 122 can include a plurality of sensing areas arranged on an annular surface of the steering handle 10, and the sensing patterns can be arranged according to positions of the sensing areas. For example, one or more sensing patterns can be disposed in one of the sensing areas, or one of the sensing pattern can overlap with multiple sensing areas, but the present disclosure is not limited thereto.

The sensing patterns Ps1, Ps2 and Ps3 are connected to the sensing lines SL1, SL2 and SL3, respectively. Each of the sensing patterns Ps1, Ps2 and Ps3 has a mesh structure. For example, the sensing patterns Ps1, Ps2 and Ps3 are arranged along a first direction D1 in the present embodiment, and the sensing pattern Ps1 is arranged in a sensing area SA1 and includes an outer frame FO and inner wires WI. The outer frame FO substantially fills up the sensing area SA1, and is connected to the corresponding one of the sensing lines, such as the sensing line SL1.

Figure 5:
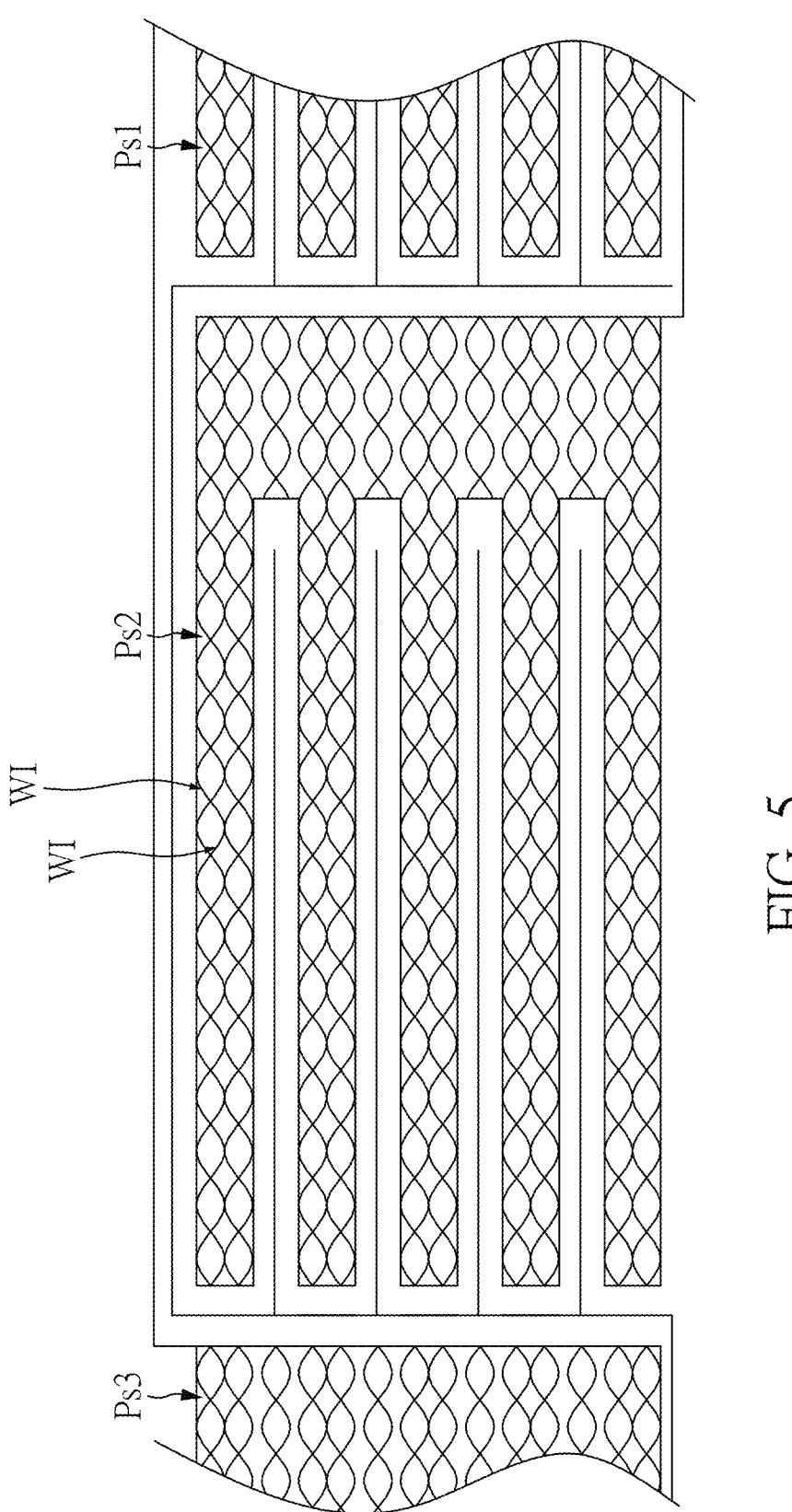
FIG. 5 is another top view of the elastic sensor layer according to one embodiment of the present disclosure.

Furthermore, the inner wires WI are connected to the outer frame FO. In this embodiment, the inner wires WI are tilted with respect to the outer frame FO, and mutually intersect with one another so as to form the mesh structure. However, the present disclosure is not limited thereto. FIG. 5 is another top view of the elastic sensor layer according to one embodiment of the present disclosure. Referring to FIG. 5, the inner wires WI each has consecutive wave shapes to form the mesh structure. As shown in FIGS. 4 and 5, the utilization of the mesh structure can circumvent the issue of a sensor area becoming inoperative due to the failure of a single line segment within that area.

The ground line GL is formed to surround the sensing pattern Ps1. For example, a first part of the ground line GL can extend along a second direction D2 and be disposed between the sensing patterns Ps1 and Ps3, and a second part of the ground line GL can extend along the second direction D2 and be disposed between the sensing patterns Ps1 and Ps2. The placement of the ground line GL can enhance the capacitive coupling between the sensing patterns and an object to be detected (e.g., the driver's hand), thereby increasing the sensitivity of the sensing layer 12 to finger touches.

In this embodiment, the outer frame FO further defines multiple recess portions, such as recess portions RP1 to RP5 in the sensing area SA1. The recess portions RP2 to RP5 form a part of a space between the sensing patterns Ps1 and Ps3, and the recess portion RP1 forms a part of a space between the sensing patterns Ps1 and Ps2.

In addition, each of the recess portions RP1 to RP5 forms a rectangular space extending along the first direction D1, and multiple ground wires GW respectively branch from the first and second parts of the ground line GL, and respectively extend into the spaces among the sensing patterns Ps1, Ps2 and Ps3, and more specifically, into the rectangular spaces formed by the recess portions RP1 to RP5. The ground wires GW extend along a second direction D2 different from the first direction D1. In this case, the first direction D1 is perpendicular to the second direction D2.

Therefore, the placement of the ground wires GW increases density and uniformity of ground areas among the sensing patterns, and thus can further enhance the capacitive coupling between the sensing patterns and the object to be detected, thereby further increasing the sensing performance (e.g., the sensitivity) of the sensing layer 12.

Specifically, the elastic sensor layer 122 can be formed by printing an elastic conductive paste (e.g., silver paste) on the first surface S1 of the elastic substrate layer 120 to form a sensor having one or more sensing regions, by arranging the sensing patterns Ps1, Ps2 and Ps3. It should be noted that both the elastic substrate layer 120 and the elastic sensor layer 122 are stretchable and can withstand external force to a certain extent without damaging the sensing lines SL1, SL2 and SL3, the sensing patterns Ps1, Ps2 and Ps3 and the ground line GL.

Referring to FIG. 2, the outer protection layer 124 can be made of ink, for example, and can provide protection and insulation effects for the elastic sensing pattern layer 122 to improve its durability.

Referring to FIG. 1, the sensing steering wheel 1 further includes a processing circuit 14 electrically connected to the sensing lines of the elastic sensor layer 122. The processing circuit 14 receives sensing signals generated by the sensing patterns in response to being touched by an object.

In some embodiments, the processing circuit 14 can be a processor or a controller, which can be configured to perform a hands-off detection according to the received sensing signals. The sensing signals are generated when the driver touches one or more of the sensing areas on the sensing steering wheel 1.

When the driver's hand comes into contact with one sensing area, it alters the electrical field of that specific area. This change can be detected and converted into the sensing signal. The processing circuit 14 can then interpret these signals to determine which specific sensing area is being touched by the driver. This information can be used for various purposes, such as the hands-off detection, in which the processing circuit 14 can detect if the driver has their hands on the sensing steering wheel 1 or not.

Furthermore, the sensing layer 12 further includes a seam area Ase that overlaps with the sensing patterns, and the sensing lines can be respectively connected to conductive wires CW as lead-out lines at the seam area Ase, so as to be electrically connected to the processing circuit 14.

Figure 6:
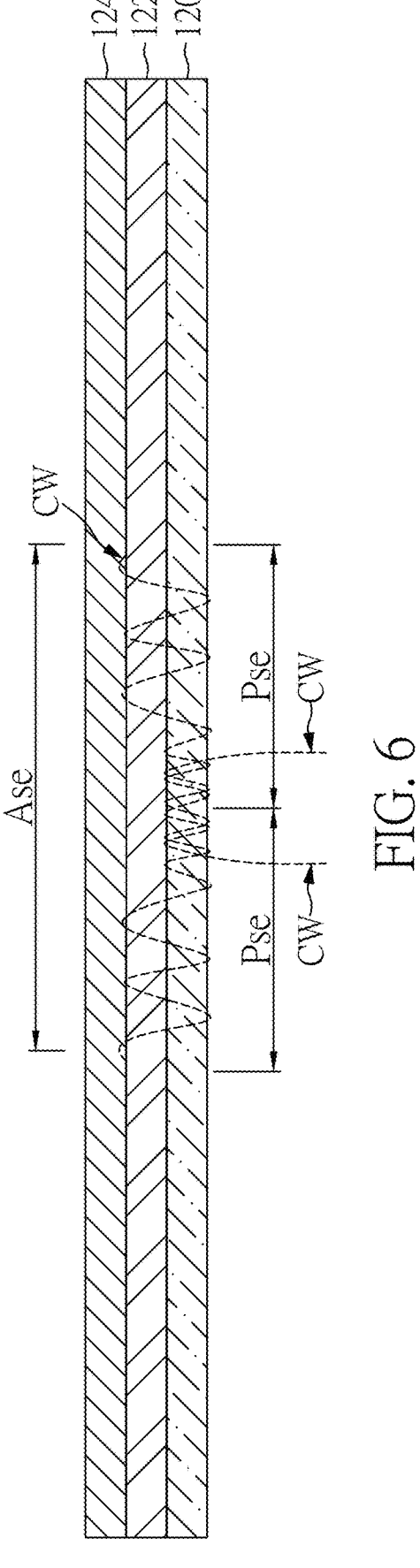
FIG. 6 is another partial cross-sectional view of the sensing steering wheel according to one embodiment of the present disclosure.

FIG. 6 is another part cross-sectional view of the sensing steering wheel according to one embodiment of the present disclosure. Referring to FIGS. 1 and 6, the sensing layer 12 has an enclosed ring structure with seam portions Pse, and the seam portions Pse are inter-connected at the seam area Ase. The conductive wires CW are used to stitch the seam portions Pse together at the seam area Ase by penetrating through the elastic substrate layer 120 and the elastic sensor layer 122.

The conductive wires CW can be enameled wires, single-core wires or other conductive wires, and can be used to increase the strength of the sensing layer 12 by repeatedly penetrating through the elastic substrate layer 120 and the elastic sensor layer 122. For example, each of the conductive wires CW can be an enameled wire that penetrates through the elastic substrate layer 120 to enhance a strength of the sensing layer 12 against a pulling force or a pushing force. In addition, the application of a printing technique allows the sensor layer 20 to be infused with conductive silver paste, thereby diminishing the extent of the dead zone, which ensures accurate detections of the driver's hand even when in contact with the seam area Ase on the sensing steering wheel 1.

Furthermore, a conductive adhesive can be applied on the conductive wires CW for conductive bonding the conductive wires CW to the sensing patterns in the elastic sensor layer 122. Black adhesive, as a part of the outer protection layer 124, can also be used as a protection layer for the conductive adhesive.

Figure 7:
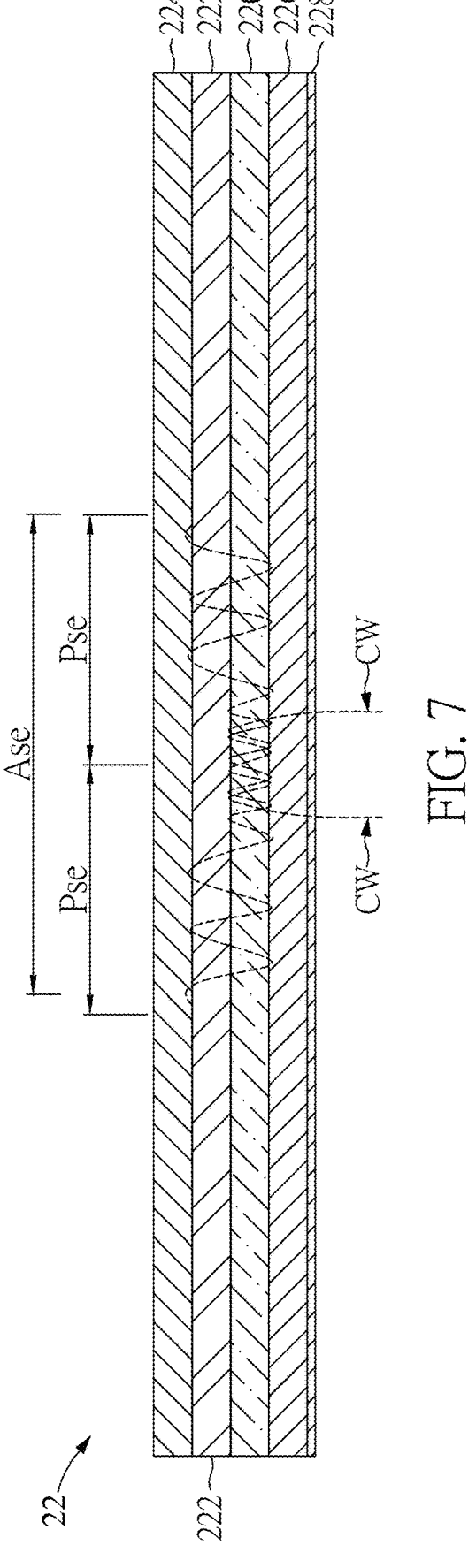
FIG. 7 is a schematic cross-sectional view of the sensing circuit layer according to another embodiment of the present disclosure.

FIG. 7 is a schematic cross-sectional view of the sensing circuit layer according to another embodiment of the present disclosure. In this embodiment, a structure of a sensing steering wheel 2 is similar to those of the sensing steering wheel 1 mentioned in FIGS. 1 and 2. Referring to FIG. 7, for convenience of explanation, the sensing circuit layer 22 is shown as a flat multi-layer structure, and the sensing circuit layer 22 includes an elastic substrate layer 220, an elastic sensor layer 222, an outer protection layer 224, a shielding layer 226 and a plurality of heat wires 228.

It should be noted that the details of the elastic substrate layer 220, the elastic sensor layer 222 and the outer protection layer 224 are basically the same as those of the elastic substrate layer 120, the elastic sensor layer 122 and the outer protection layer 124, and thus repeated descriptions are omitted herein.

Similar to FIG. 5, the sensing layer 22 has an enclosed ring structure with seam portions Pse, and the seam portions Pse are inter-connected at the seam area Ase. The conductive wires CW are used to stitch the seam portions Pse together at the seam area Ase by penetrating through the elastic substrate layer 220 and the elastic sensor layer 222.

Moreover, the shielding layer 226 is disposed under the elastic substrate layer 220, and the heat wires 228 are disposed under the shielding layer 226.

The shielding layer 226 can be formed on the second surface S2 of the elastic substrate layer 220 by printing elastic conductive materials such as graphene or conductive silver paste. It should be noted that, since the shielding layer 226 is made of elastic conductive material, it can be used as an electrical shielding layer between the elastic sensing pattern layer 222 and the heat wires 228, so as to provide an anti-interference capability for the elastic sensor layer 222.

The heat wires 228 can be conductive wires such as enameled wires, single-core wires or other conductive wires with designed resistances, and can be disposed under the shielding layer 226.

Figure 8:
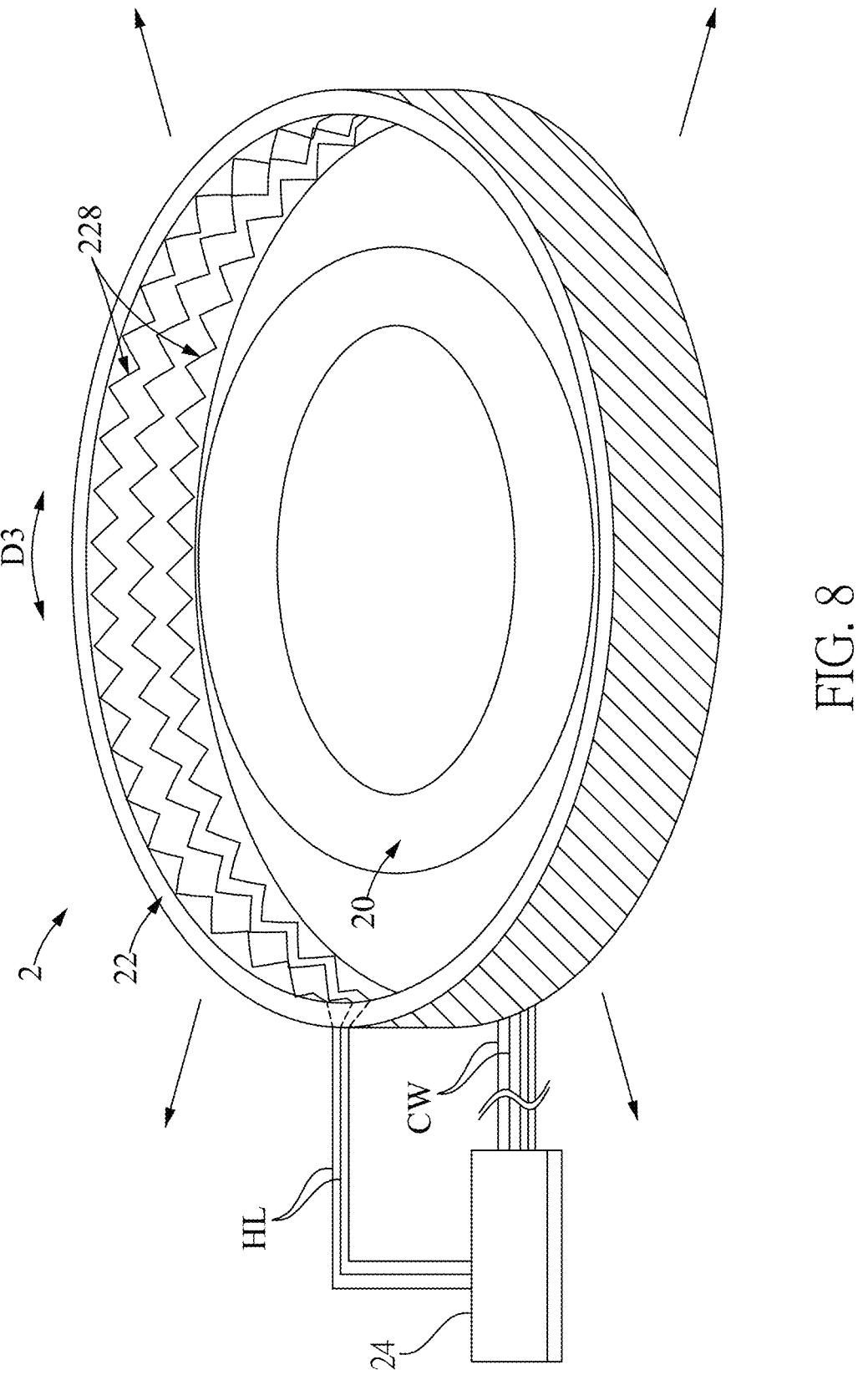
FIG. 8 is an is a schematic exploded view of the sensing steering wheel with a stretched sensing layer according to another embodiment of the present disclosure.

FIG. 8 is an is a schematic exploded view of the sensing steering wheel with a stretched sensing layer according to another embodiment of the present disclosure. Referring to FIG. 8, the sensing steering wheel 2 further includes a processing circuit 24, and the sensing lines can be respectively connected to conductive wires CW, so as to be electrically connected to the processing circuit 24.

The processing circuit 24 is further electrically connected to the heat wires 228 through a plurality of heat lines HL. The processing circuit 24 can be configured to control the heat wires 228 for heating the sensing steering wheel 2.

Furthermore, as shown in FIG. 8, the sensing layer 22 can be stretched and retracted along a third direction D3 to be retractably sleeved on the wheel handle 20, and each of the heat wires 228 is arranged in consecutive S-shapes along the third direction D3. In other words, given that the sensing layer 22 has constraints in terms of unidirectional stretching, the heating wires 228 can be configured in a lateral S-shaped or V-shaped pattern. This arrangement ensures an adequate length for stretching when the sensing layer 22 undergoes expansion. However, the aforementioned details are disclosed for exemplary purposes only, and are not meant to limit the scope of the present disclosure.

Figure 9:
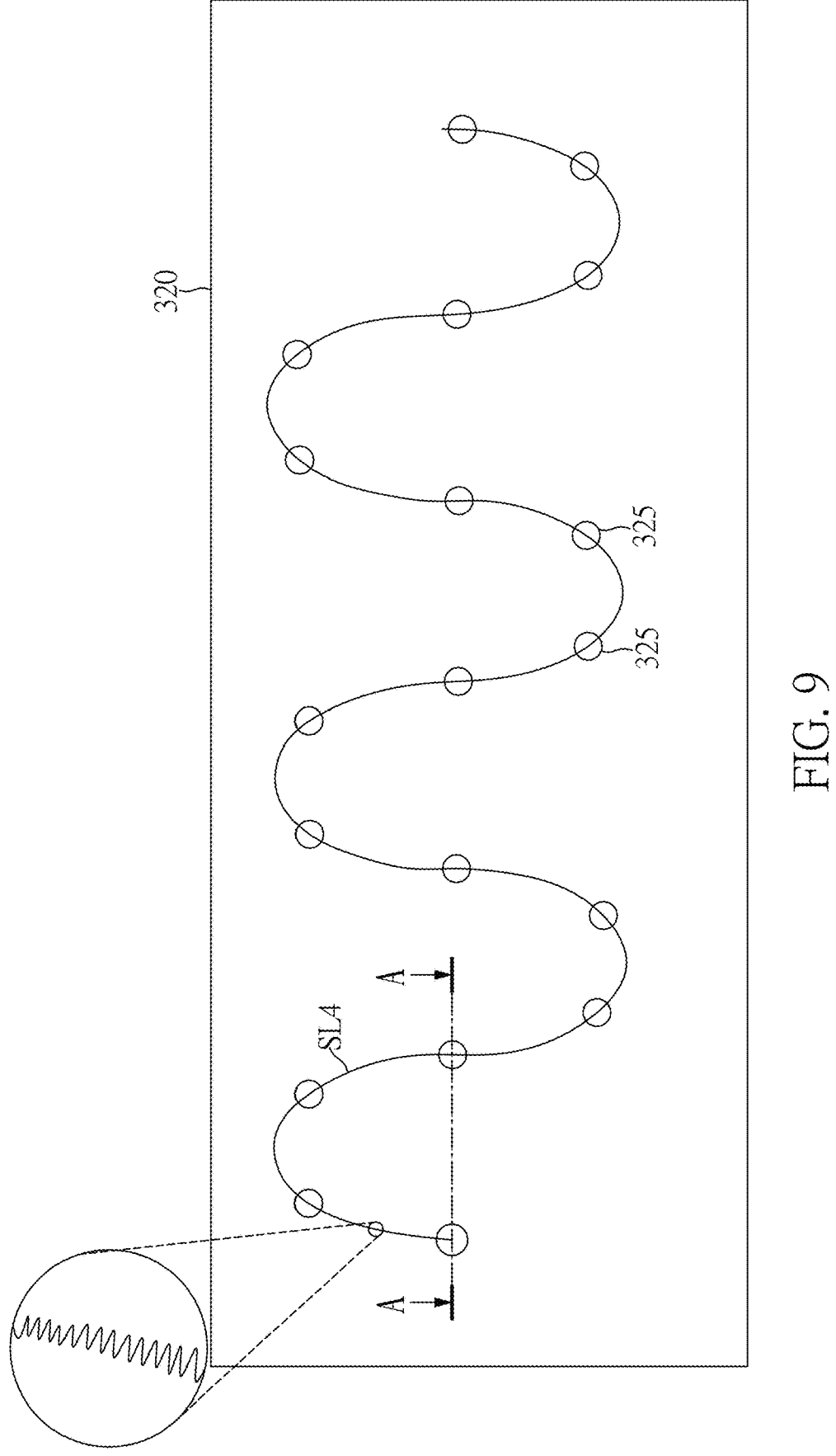
FIG. 9 is a top view of the sensing layer according to one embodiment of the present disclosure.
Figure 10:
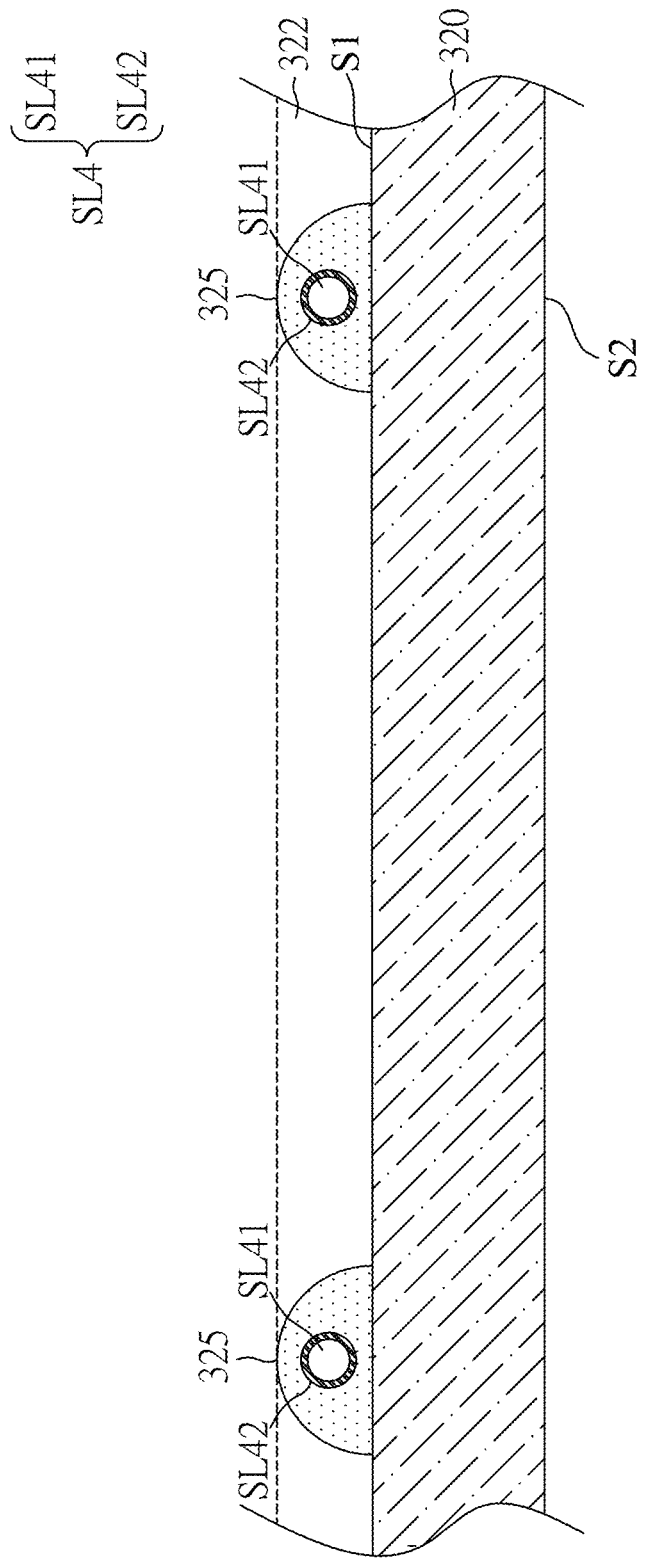
FIG. 10 is a schematic cross-sectional view of the sensing layer captured along a line A-A of FIG. 9.

Reference is made to FIGS. 9 and 10. FIG. 9 is a top view of the sensing layer according to one embodiment of the present disclosure, and FIG. 10 is a schematic cross-sectional view of the sensing layer captured along a line A-A of FIG. 9. As shown in FIG. 9, for convenience of explanation, the sensing layer 32 is shown as a flat structure. The elastic substrate layer 320 can be made of an elastic material such as thermoplastic polyurethane (TPU), thermoplastic vulcanizate or thermoplastic rubber, and has a first surface S1 and a second surface S2 that are opposite to each other. The TPU or other stretchable materials can be used to as a base material to make the sensing layer 32 stretchable, such that wrinkles can be greatly reduced when sleeving the sensing layer 32 onto the steering handle 10.

Referring to FIGS. 9 and 10, a plurality sensing lines SL4 can be formed on the first surface S1 of the elastic substrate layer 320, and for convenience of explanation, only one sensing line SL4 is shown in FIG. 9. The sensing line SL4 can be attached to the elastic substrate layer 320 by dispensing adhesive on a plurality of fixing points arranged along a setting path corresponding to the sensing line SL4. It should be noted that adjacent two of the fixing points can be separated by a predetermined distance, but the present disclosure is not limited thereto.

Referring to FIG. 10, the adhesive 325 can be a colloid and formed to surround the sensing line SL4. The sensing line SL4 can be an enameled wire, which includes a conductive metal wire SL41 coated with an insulation layer SL42. It should be noted that a material of the adhesive 325 can be selected, so as to provide a first level of adhesion between the adhesive 325 and the elastic substrate layer 320 and a second level of adhesion between the adhesive 325 and the insulation layer SL42.

Noted that the first level of adhesion is higher than the second level of adhesion, such that the adhesive 325 can be stably fixed to the elastic substrate layer 320, but the sensing line SL4 can be moved slightly relative to the adhesive 325, so as to prevent the sensing line SL4 from being broken when the elastic substrate layer 320 is stretched. More specifically, the material of the adhesive 325 that forms weak chemical bond or no chemical bond with the insulation layer SL42 can be selected.

Moreover, each of the sensing lines SL4 can be arranged in consecutive S-shapes along the setting path. In other words, given that the sensing layer 32 has constraints in terms of unidirectional stretching, the sensing line SL4 can be configured in a lateral S-shaped or V-shaped pattern. This arrangement ensures an adequate length for stretching when the sensing layer 320 undergoes expansion.

Figure 11:
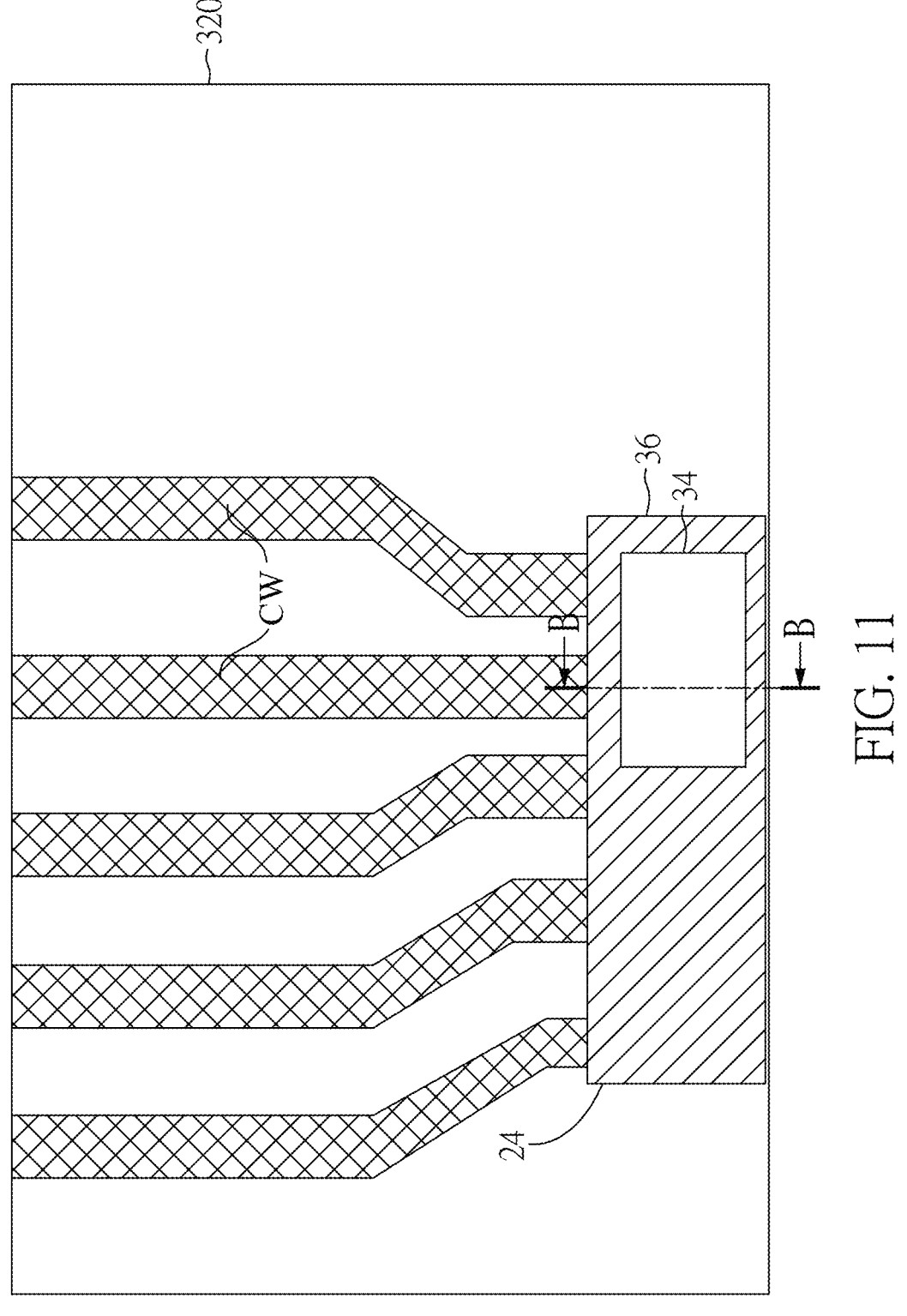
FIG. 11 is a top view of a sensing layer, a flexible printed circuit board (FPC) and a processing circuit according to one embodiment of the present disclosure.
Figure 12:
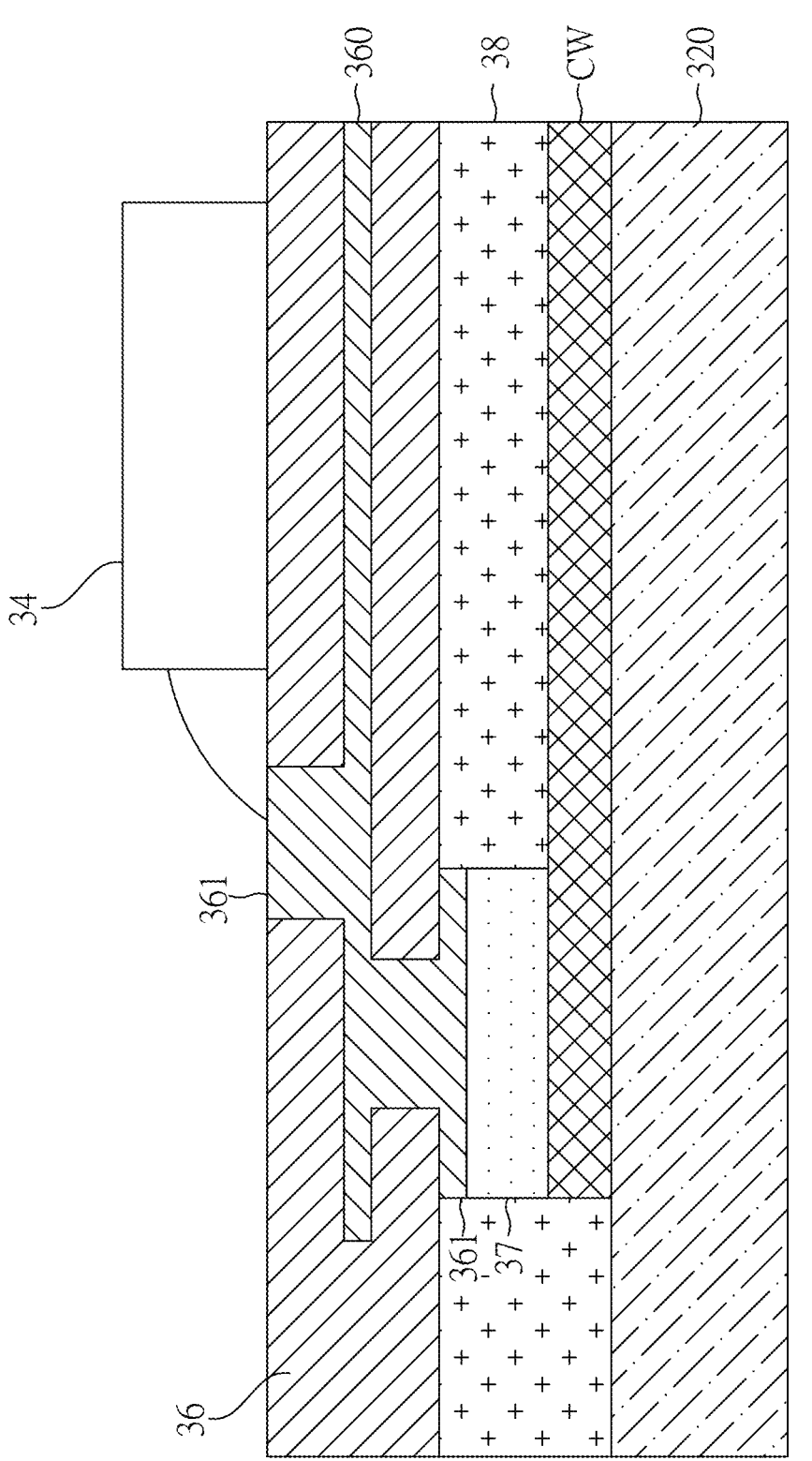
FIG. 12 is a schematic cross-sectional view of the sensing layer captured along a line B-B of FIG. 11.

Reference is made to FIGS. 11 and 12. FIG. 11 is a top view of a sensing layer, a flexible printed circuit board (FPC) and a processing circuit according to one embodiment of the present disclosure, and FIG. 12 is a schematic cross-sectional view of the sensing layer captured along a line B-B of FIG. 11.

As shown in FIG. 11, the processing circuit 34 can be a chip disposed on the elastic substrate layer 320, and the FPC 36 can be disposed between the processing circuit 34 and the elastic substrate layer 320. Conductive wires CW that are used to connected between the processing circuit 34 and the sensing lines, can be made of sliver paste and formed on the elastic substrate layer 320. The FPC 36 includes a conductive layer 360, such as a flexible copper foil, and the conductive layer 360 has bonding pads 361 for being connected to the conductive wire CW and the processing circuit 34, respectively.

In some embodiments, a conductive material 37 can be disposed between the bonding pad 361 and the conductive wire CW, such as a sliver glue. Furthermore, a flexible supporting layer 38 can be disposed between the FPC 36 and the elastic substrate layer 320, and the flexible supporting layer 38 can be used to support the FPC 36, and serve as a buffer layer to prevent the FPC 36 being damaged.

Beneficial Effects of the Embodiments

In conclusion, in the sensing steering wheel provided by the present disclosure, the utilization of the mesh structure can circumvent the issue of a sensor area becoming inoperative due to the failure of a single line segment within that area.

Furthermore, the placement of the ground line and the ground wires can enhance the capacitive coupling between the sensing patterns and an object to be detected and increase density and uniformity of ground areas among the sensing patterns, thereby increasing the sensitivity of the sensing layer.

In addition, the conductive wires as lead-out lines of the sensing lines, can be used to increase the strength of the sensor layer by repeatedly penetrating through the elastic substrate layer and the elastic sensor layer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensing steering wheel, comprising:
a wheel handle;
a sensing layer being retractably sleeved on the wheel handle, wherein the sensing layer includes:
an elastic substrate layer; and
an elastic sensor layer disposed on the elastic substrate layer, wherein the elastic sensor layer includes:
a plurality of sensing lines;
a plurality of sensing patterns connected to the plurality of sensing lines, respectively, and each of the sensing patterns having a mesh structure and overlapping with a seam area of the sensing area;
at least one ground line; and
a plurality of ground wires branching from the at least one ground line and extending into spaces among the plurality of sensing patterns; and
a processing circuit electrically connected to the sensing lines;
wherein the sensing layer has an enclosed ring structure with seam portions, and the seam portions are interconnected at the seam area;
wherein the processing circuit is electrically connected to the sensing lines through a plurality of conductive wires, respectively, and the conductive wires are used to stitch the seam portions together at the seam area by penetrating through the elastic substrate layer and the elastic sensor layer.

2. The sensing steering wheel according to claim 1, wherein the conductive wires are further secured to the sensing layer by an adhesive material.

3. The sensing steering wheel according to claim 2, wherein the sensing layer further includes:
a shielding layer disposed under the elastic substrate layer; and
a plurality of heat wires under the shielding layer.

4. The sensing steering wheel according to claim 3, wherein the sensing layer is stretched and retracted along a third direction to be retractably sleeved on the wheel handle, and each of the heat wires is arranged in consecutive S-shapes along the third direction.

5. The sensing steering wheel according to claim 2, wherein the heat wires are electrically connected to the processing circuit, and the processing circuit is configured to control the heat wires for heating the sensing steering wheel.

6. The sensing steering wheel according to claim 2, wherein each of the conductive wires is an enameled wire that penetrates through the elastic substrate layer to enhance a strength of the sensing layer against a pulling force or a pushing force.

7. A sensing steering wheel, comprising:
a wheel handle;
a sensing layer being retractably sleeved on the wheel handle, wherein the sensing layer includes:
    an elastic substrate layer; and
    an elastic sensor layer disposed on the elastic substrate layer, wherein the elastic sensor layer includes:
        a plurality of sensing lines;

a plurality of sensing patterns connected to the plurality of sensing lines; and
a processing circuit electrically connected to the sensing lines;
wherein the processing circuit is electrically connected to the sensing lines through a plurality of conductive wires, respectively, and a conductive adhesive is applied on the conductive wires for conductive bonding the conductive wires to the sensing patterns in the elastic sensor layer;
wherein each of the conductive wires is an enameled wire that penetrates through the elastic substrate layer to enhance a strength of the sensing layer against a pulling force or a pushing force.

8. The sensing steering wheel according to claim 7, wherein the sensing layer has an enclosed ring structure with seam portions, and the seam portions are inter-connected at the seam area.

* * * * *